(12) United States Patent
Campey et al.

(10) Patent No.: US 10,045,472 B2
(45) Date of Patent: *Aug. 14, 2018

(54) TURF TREATMENT IMPLEMENT

(71) Applicant: Richard Campey Limited, Cheshire (GB)

(72) Inventors: Richard John Campey, Cheshire (GB); Simon Jonathan Gumbrill, Cheshire (GB); Johannes Hendricus Wilhelmus Herman De Kort, HB Breda (NL)

(73) Assignee: Richard Campey Limited, Cheshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/792,988

(22) Filed: Oct. 25, 2017

(65) Prior Publication Data

US 2018/0103572 A1 Apr. 19, 2018

Related U.S. Application Data

(62) Division of application No. 14/438,254, filed as application No. PCT/GB2013/000451 on Oct. 23, 2013, now Pat. No. 9,820,422.

(30) Foreign Application Priority Data

Oct. 24, 2012 (GB) .................................. 1219124.3

(51) Int. Cl.
*A01B 45/02* (2006.01)
*A01D 34/53* (2006.01)

(52) U.S. Cl.
CPC ............ *A01B 45/026* (2013.01); *A01D 34/53* (2013.01)

(58) Field of Classification Search
CPC .............................. A01B 45/02; A01B 45/026
USPC ........................................ 172/21, 22; 404/94
See application file for complete search history.

(56) References Cited

U.S. PATENT DOCUMENTS

| | | | |
|---|---|---|---|
| 4,044,841 | A | 8/1977 | Smith |
| 4,268,089 | A | 5/1981 | Spence |
| 4,697,850 | A | 10/1987 | Tuneblom |
| 5,052,757 | A | 10/1991 | Latham |
| 5,078,540 | A | 1/1992 | Jakob |
| 5,582,256 | A | 12/1996 | Dummermuth |
| 5,842,747 | A | 12/1998 | Winchester |
| 6,523,768 | B2 | 2/2003 | Recker |
| 7,338,134 | B2 | 3/2008 | Latham |

(Continued)

FOREIGN PATENT DOCUMENTS

| | | |
|---|---|---|
| AU | 412721 B2 | 4/1971 |
| DE | 2745667 A1 | 4/1979 |

(Continued)

OTHER PUBLICATIONS

Lawn Aeration: How Deep?, eHow, Kimberly Richardson, dated Jul. 19, 2016, http://www.ehow.com/facts_7513269_lawn-aeration-deep.html.

*Primary Examiner* — Gary S Hartmann
(74) *Attorney, Agent, or Firm* — Dority & Manning, P.A.

(57) ABSTRACT

A cylindrical turf treatment rotor adapted to be driven in rotation about a horizontal axis, and provided with wear-resistant teeth extending along one or more helical tracks on the rotor, the teeth being individually attached to the rotor so as to be capable of individual removal for replacement or refurbishing or for reconfiguring the rotor.

19 Claims, 4 Drawing Sheets

(56) References Cited

U.S. PATENT DOCUMENTS

| | | |
|---|---|---|
| 7,448,567 B2 | 11/2008 | Roozeboom |
| 7,810,531 B2 | 10/2010 | Labbe |
| 7,959,099 B1 | 6/2011 | Cox |
| 8,066,213 B2 | 11/2011 | Marquardsen |
| 8,167,225 B2 | 5/2012 | Gaudreault |
| 8,893,997 B2 | 11/2014 | Gaudreault |
| 9,730,372 B2* | 8/2017 | Campey ............... A01B 45/026 |
| 9,820,422 B2* | 11/2017 | Campey ............... A01D 34/53 |
| 2008/0298909 A1 | 12/2008 | Gaudreault |
| 2015/0282420 A1 | 10/2015 | Campey et al. |
| 2017/0367249 A1* | 12/2017 | Campey ............... A01B 45/026 |

FOREIGN PATENT DOCUMENTS

| | | |
|---|---|---|
| FR | 2876864 | 4/2006 |
| GB | 2160401 | 12/1985 |
| GB | 2487262 | 7/2012 |
| WO | WO 89/07882 | 9/1989 |
| WO | WO 2013/027005 | 2/2013 |

* cited by examiner

TURF TREATMENT IMPLEMENT

RELATED APPLICATIONS

The present application is a divisional application of U.S. patent application Ser. No. 14/438,254, filed on Apr. 24, 2015, which is the U.S. National Stage entry of International Application Number PCT/GB2013/000451 filed under the Patent Cooperation Treaty having a filing date of Oct. 23, 2013, which claims priority to GB Patent Application Number 1219124,3 having a filing date of Oct. 24, 2012. The present application claims priority to U.S. patent application Ser. No. 14/438,254, International Application Number PCT/GB2013/000451, and GB Patent Application Number 1219124.3, which are all herein incorporated by reference.

FIELD OF THE INVENTION

This invention relates to implements for turf treatment, more particularly for treatment of sports playing surfaces such as football, rugby and hockey pitches, and tennis courts which, during the course of a playing season, are subject to wear and tear and also suffer from a build-up of thatch, which is an accumulation of layers of partially decomposed leaves, stems and roots. Diseases and other blights including algae, moss, fungi, and slime mould can invade the turf, and may be made worse by the presence of thatch.

BACKGROUND OF THE INVENTION

It is usually recommended that thatch be treated by mechanical thatching equipment, an operation usually referred to as scarification, but sometimes known as verti-cutting, although that term is also used for the process of cutting vertically into the turf using fine blades, sometimes known as turf grooming. It is recommended to carry out scarification in several treatments rather than attempting to remove all the thatch at once, but this is essentially because conventional scarifiers remove thatch in thin furrows, leaving 'ridges' of thatch between them, and so cannot remove all the thatch in one pass.

U.S. Pat. No. 6,094,860 discloses the use of artificial fibre reinforcement for grass turf areas in playing fields subject to heavy wear, and other patents and proprietary systems similarly involve the use of artificial fibre reinforcement.

"Desso® Grassmaster" is a turf reinforcement system in which artificial grass fibres are injected some 20 cm deep into a grass surface, projecting some 25 mm above the soil. The maintenance of this system, as regards mowing verti-cutting and ventilating, is said to be no different from the maintenance of ordinary turf. Mowing, of course, must be carried out with the cutter height at or above the height of the artificial grass fibres, e.g. at 26 mm or more if the fibre height is 25 mm, otherwise they would be cut or pulled out.

The artificial grass fibres are injected into a matrix of sand, which of course has no nutritional value, and there is only a thin top layer of humus, if indeed any, so the natural grass needs to be treated with fertiliser more than it would if grown in deep soil. This exacerbates problems of disease and infestation, bearing in mind that about 97% of the turf is natural grass. The sand also, over the course of a playing season. compacts more than does the usual substrate of natural, unreinforced turf.

On this, or indeed any, turf, moreover, undesired grasses and weeds such as clover can be a problem. Clover is especially problematic on playing surfaces such as tennis courts, as it tends to be slippery. Weeds are usually treated with systemic herbicides, which take time to act and which may require several treatments over a space of weeks.

SUMMARY OF THE INVENTION

The present invention provides an improved apparatus for treating turf, including artificial grass-reinforced turf planted in a matrix of sand and/or soil, that is capable of removing thatch, diseased or blighted humus and sand, even all of the grass and weeds without, however, affecting the artificial grass reinforcement, if present.

The invention comprises a cylindrical turf treatment rotor adapted to be driven in rotation about a horizontal axis, and provided with wear-resistant teeth extending along one or more helical tracks on the rotor, the teeth being individually attached to the rotor so as to be capable of individual removal for replacement or refurbishing or for reconfiguring the rotor.

The teeth may be removably attached to blades fixed on the rotor. The teeth may be bolted on to the blades, and may be attached by a single bolt, the blades having recesses or so arranged in relation to adjacent blades as to define a recess into which the teeth fit so as to be held securely in position by a single bolt.

The blades may be fixed in slots, which may be laser-cut, in the rotor, and may be welded in the slots.

The teeth may have tips extending at least 60 mm above the cylindrical surface of the rotor.

The tips may extend up to 200 mm above the cylindrical surface of the rotor.

The teeth may be of wear resistant material or at least tipped with wear resistant material such as tungsten carbide.

The teeth may extend on four equally spaced helical tracks, and blading may be provided for four tracks.

With teeth closely spaced along each of four helical tracks, and set to an appropriate depth of penetration of the teeth, the rotor will be capable of removing in one pass all or substantially all thatch, grass and infected humus or sand. In this configuration, it will be capable of treating Desso® Grassmaster reinforced turf without disturbing the reinforcing fibres, leaving the ground ready for reseeding. Reconfigured to have two tracks only, by removing the teeth from two tracks of blading, it will function as a scarifier, removing thatch to a desired depth but leaving turf. In this configuration it will be suitable for treating ordinary, unreinforced turf.

BRIEF DESCRIPTION OF THE DRAWINGS

A cylindrical turf treatment rotor according to the invention will now be described with reference to the accompanying drawings, in which.

DETAILED DESCRIPTION

Figure 1:
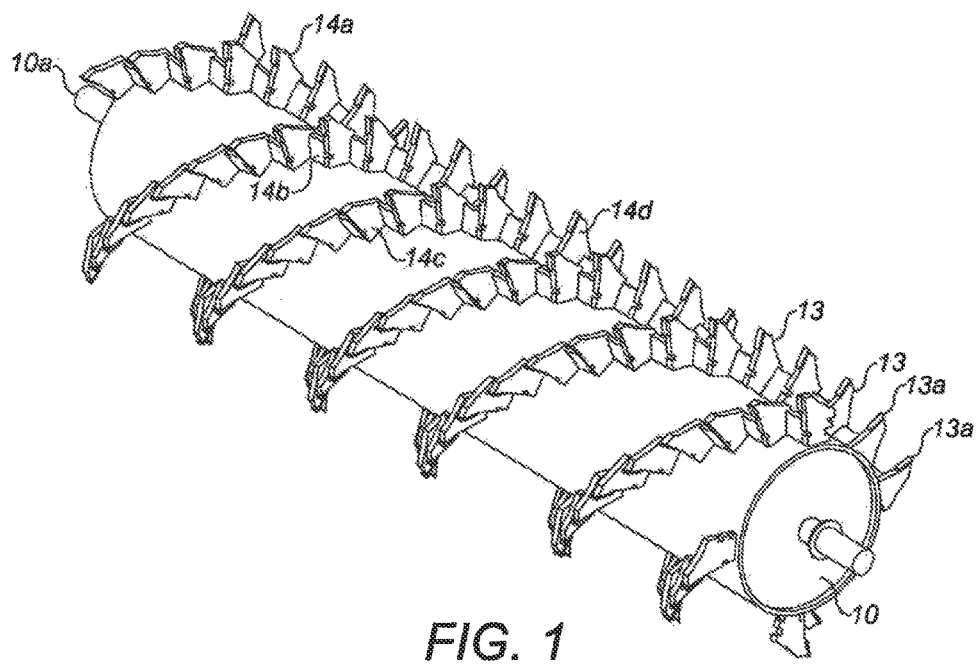
FIG. 1 is a perspective view of one embodiment of rotor.
Figure 2:
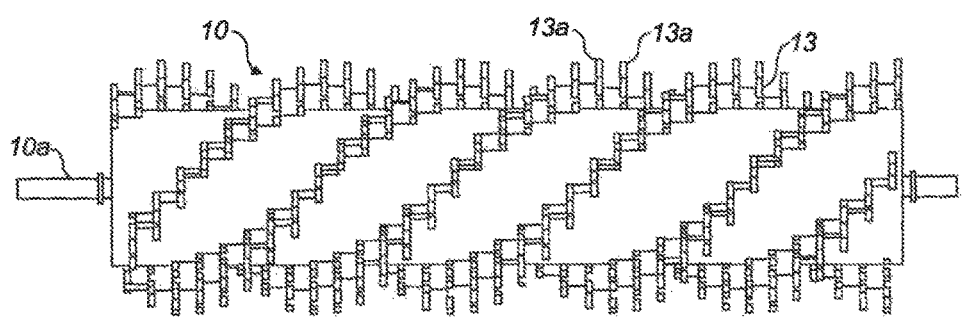
FIG. 2 is a front elevation of the rotor of FIG. 1.
Figure 3:
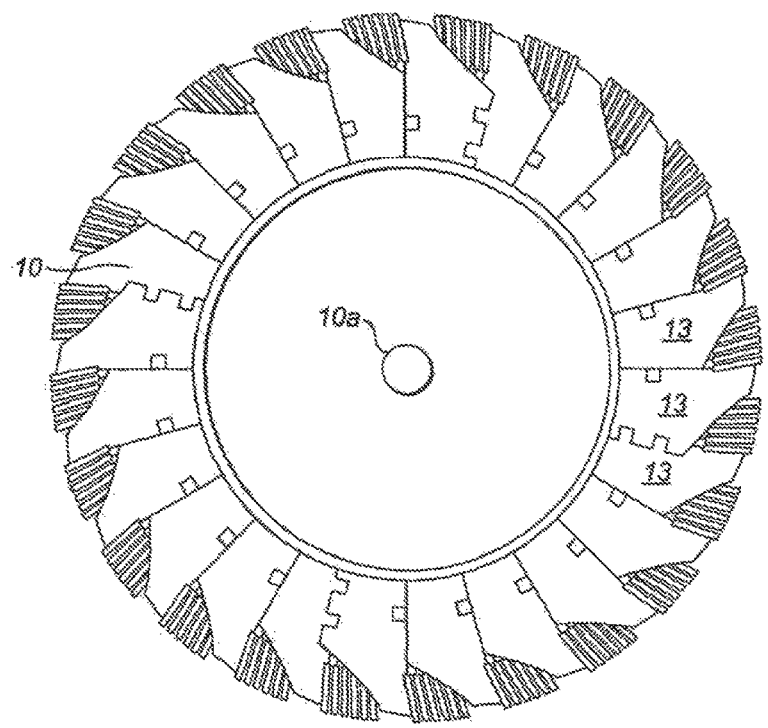
FIG. 3 is an end-on view of the rotor of FIG. 1.

The drawings illustrate a cylindrical turf treatment rotor 10 adapted to be driven in rotation about a horizontal axis-axle 10a—and provided with teeth 13 extending along one or more helical tracks 14 on the rotor 10, the teeth 13 being individually attached to the rotor 10 and connected to adjacent teeth 13, the teeth 13 having tips 13a extending at least 60 mm above the cylindrical surface of the rotor 10.

The tips 13a may extend up to 200 mm above the cylindrical surface of the rotor.

The teeth 13 may extend on four equally spaced helical tracks 14a, 14b, 14c, 14d.

The teeth 13 are removably attached, so that they may be replaced or refurbished when worn or damaged in use and so that the rotor 10 may be reconfigured. With teeth 13 closely spaced along each of four helical tracks 14, the rotor 10 will be capable of removing in one pass all or substantially all thatch, grass and infected humus and/or sand, but with two tracks only, it will function as a scarifier, selectively removing thatch to a desired depth.

Figure 4:
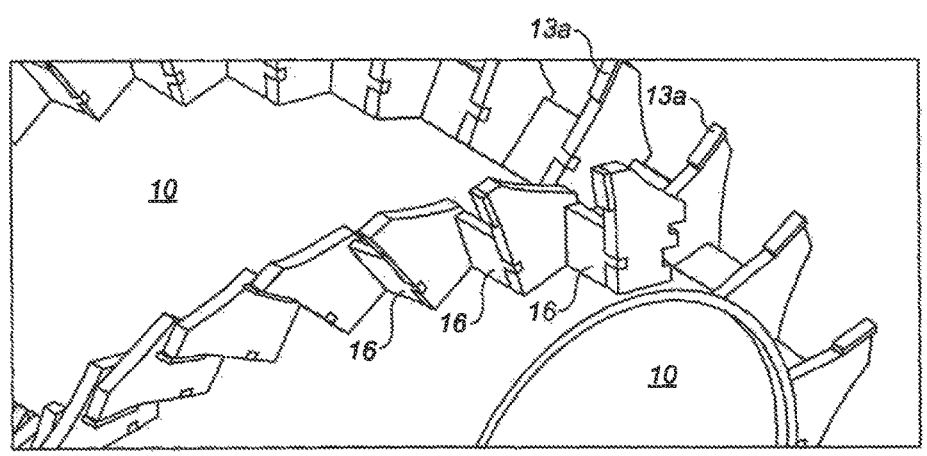
FIG. 4 is a close-up view of teeth on the roller of FIG. 1 showing a first attachment scheme.

In the embodiment shown particularly in FIG. 4, the teeth 13 fit into slots in the rotor 10 surface and are locked in place by connecting members 16 connecting them to adjacent teeth 13.

Figure 5:
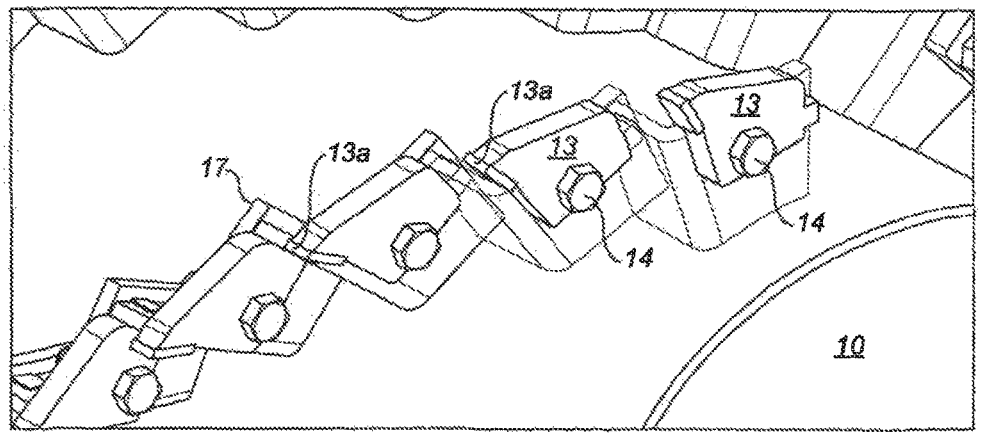
FIG. 5 is a close-up view of teeth on the roller showing a second attachment scheme.
Figure 6:
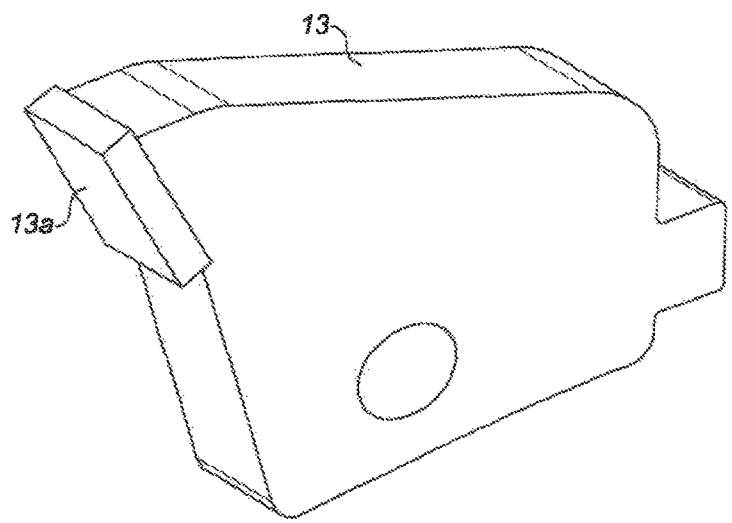
FIG. 6 is a view of a single tooth for the scheme illustrated in FIG. 5.

In the embodiment shown particularly in FIGS. 5 and 6, the teeth 13 are bolted, with a single bolt 13a, to blades 17 welded into slots laser-cut into the rotor surface. The blades 17 have recesses or are so arranged in relation to adjacent blades as to define a recess into which the teeth fit so as to be held securely in position by a single bolt 14.

The teeth 13, as better seen in FIG. 6, are generally trapezoidal in shape

The teeth 13 may be of wear resistant material, but, as illustrated, are of steel tipped with wear resistant material 13a such as tungsten carbide.

Figure 7:
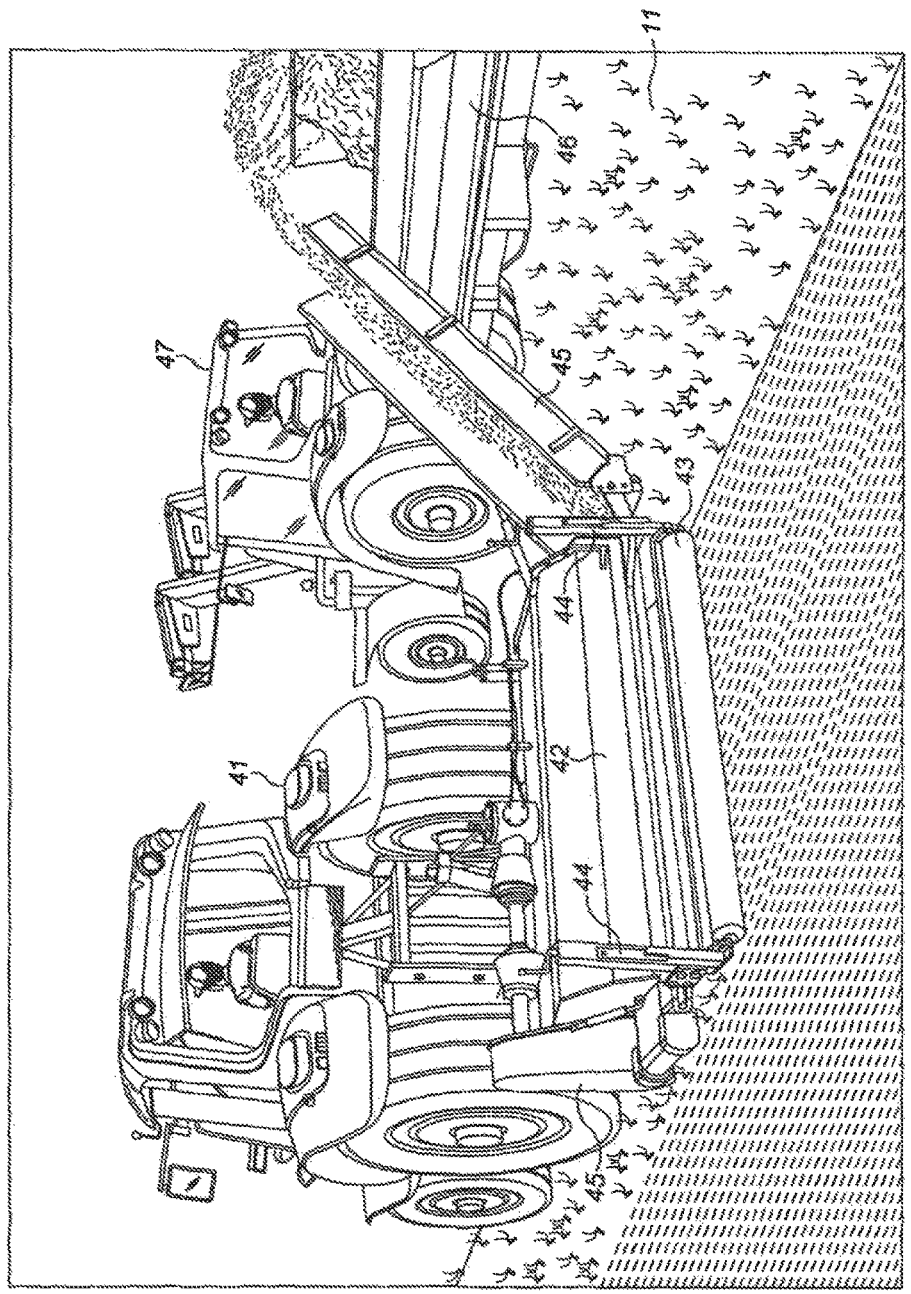
FIG. 7 is a rear view of a rotor in use.

In use, as shown in FIG. 7, the rotor 10, not shown per se in this Figure, but mounted in a chassis 42, is drawn over turf 11, by a tractor 41. The chassis 42 has a ground roller 43 and a blade height control arrangement 44 adapted to deploy the teeth 13 below turf level 14. The tractor 41 is driven to traverse the rotor 10 over the turf so deployed and has a power take-off transmission 45 to rotate the rotor 10 so that the blades 13 move through the turf 11 pulling out thatch, natural grass 12 and matrix material, soil and/or sand. The rotor 10 is driven so that the teeth 13 drive into the turf 11 as it moves forward. The material lifted from the turf is driven to the right of the tractor 41 by the action of the helically disposed teeth 13 and is lifted on an elevator 45 into a trailer 46 drawn behind a second tractor 47.

As shown, the rotor 10 has teeth of sufficient depth and density that they can, using rotor height control arrangement 45, remove all or substantially all thatch, grass and diseased matrix, leaving a friable surface onto which fresh seed may be sown. A roller of, say, one meter breadth, may thus treat a football or like sized field on a single pass, two passes at most, an operation comfortably accommodated within a single day's work.

If the rotor 10 is reconfigured by removing teeth from two of the helical tracks-opposite helices, so as to leave the rotor balanced and deployed, using the height control, so that the teeth penetrate to a lesser depth, the rotor 11 will constitute an effective scarifier, giving a less drastic treatment.

In either configuration, the rotor 10 will leave artificial grass turf reinforcement, such as Desso Grassmaster® reinforcement, unaffected.

The invention claimed is:

1. A cylindrical turf treatment rotor adapted to be driven in rotation about a horizontal axis, and provided with wear-resistant teeth adapted to penetrate the turf and be driven below the turf level, the teeth extending along two helical tracks on the rotor so as to be capable of selectively removing thatch from the turf to a desired depth below the turf level, the teeth being individually attached to the rotor so as to be capable of individual removal for replacement or refurbishing or for reconfiguring the rotor, the teeth being connected to adjacent teeth.

2. A cylindrical turf treatment rotor according to claim 1, in which the teeth are removably attached to blades fixed on the rotor.

3. A cylindrical turf treatment rotor according to claim 2, in which the teeth are bolted on to the blades.

4. A cylindrical turf treatment rotor according to claim 3, in which the teeth are attached by a single bolt, the blades having recesses or being so arranged in relation to adjacent blades as to define a recess into which the teeth fit so as to be held securely in position by a single bolt.

5. A cylindrical turf treatment rotor according to claim 2, in which the blades are fixed in slots in the rotor.

6. A cylindrical turf treatment rotor according to claim 1, in which the teeth extend up to 200 mm above the cylindrical surface of the rotor.

7. A cylindrical turf treatment rotor according to claim 1, in which the teeth are comprised of a wear resistant material.

8. A cylindrical turf treatment rotor according to claim 3, in which the blades are fixed in slots in the rotor.

9. A cylindrical turf treatment rotor according to claim 4, in which the blades are fixed in slots in the rotor.

10. A cylindrical turf treatment rotor according to claim 1, in which the teeth have tips extending at least 60 mm above the surface of the rotor.

11. A cylindrical turf treatment rotor according to claim 5, wherein the blades have been laser-cut.

12. A cylindrical turf treatment rotor according to claim 5, wherein the blades are welded in the slots.

13. A cylindrical turf treatment rotor according to claim 8, wherein the blades have been laser-cut.

14. A cylindrical turf treatment rotor according to claim 8, wherein the blades are welded in the slots.

15. A cylindrical turf treatment rotor according to claim 9, wherein the blades have been laser-cut.

16. A cylindrical turf treatment rotor according to claim 9, wherein the blades are welded in the slots.

17. A cylindrical turf treatment rotor according to claim 7, wherein the wear resistant material of the teeth comprises tungsten carbide.

18. A cylindrical turf treatment rotor according to claim 17, wherein the wear resistant material is only located at the tips of the teeth.

19. A cylindrical turf treatment rotor according to claim 7, wherein the wear resistant material is only located at the tips of the teeth.

* * * * *